3 Sheets—Sheet 1.

N. S. SAXTON.
MACHINE FOR ADDING NUMBERS.

No. 13,800.  Patented Nov. 13, 1855.

No. 1

3 Sheets—Sheet 2.
N. S. SAXTON.
MACHINE FOR ADDING NUMBERS.
No. 13,800. Patented Nov. 13, 1855.
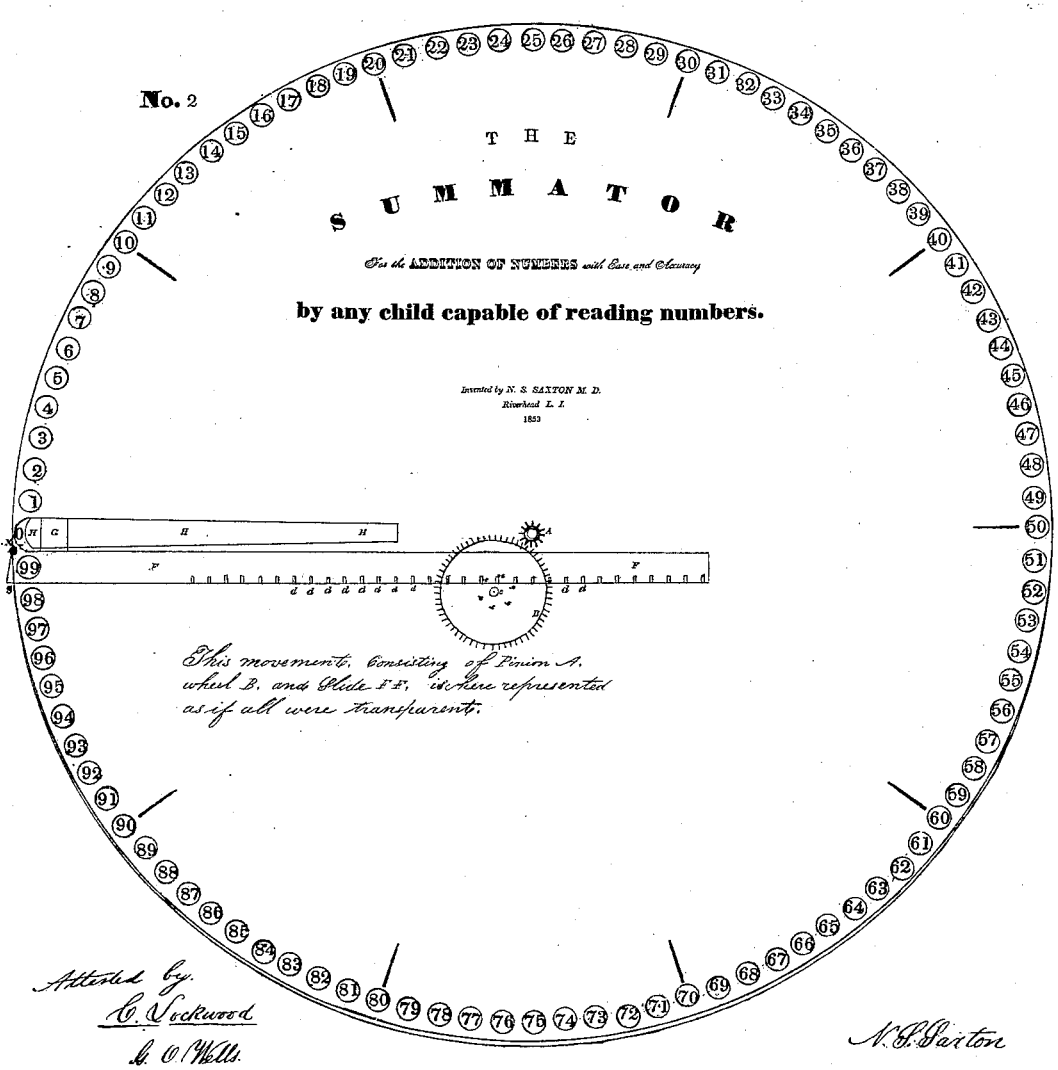

N. S. SAXTON.
MACHINE FOR ADDING NUMBERS.
No. 13,800.   Patented Nov. 13, 1855.
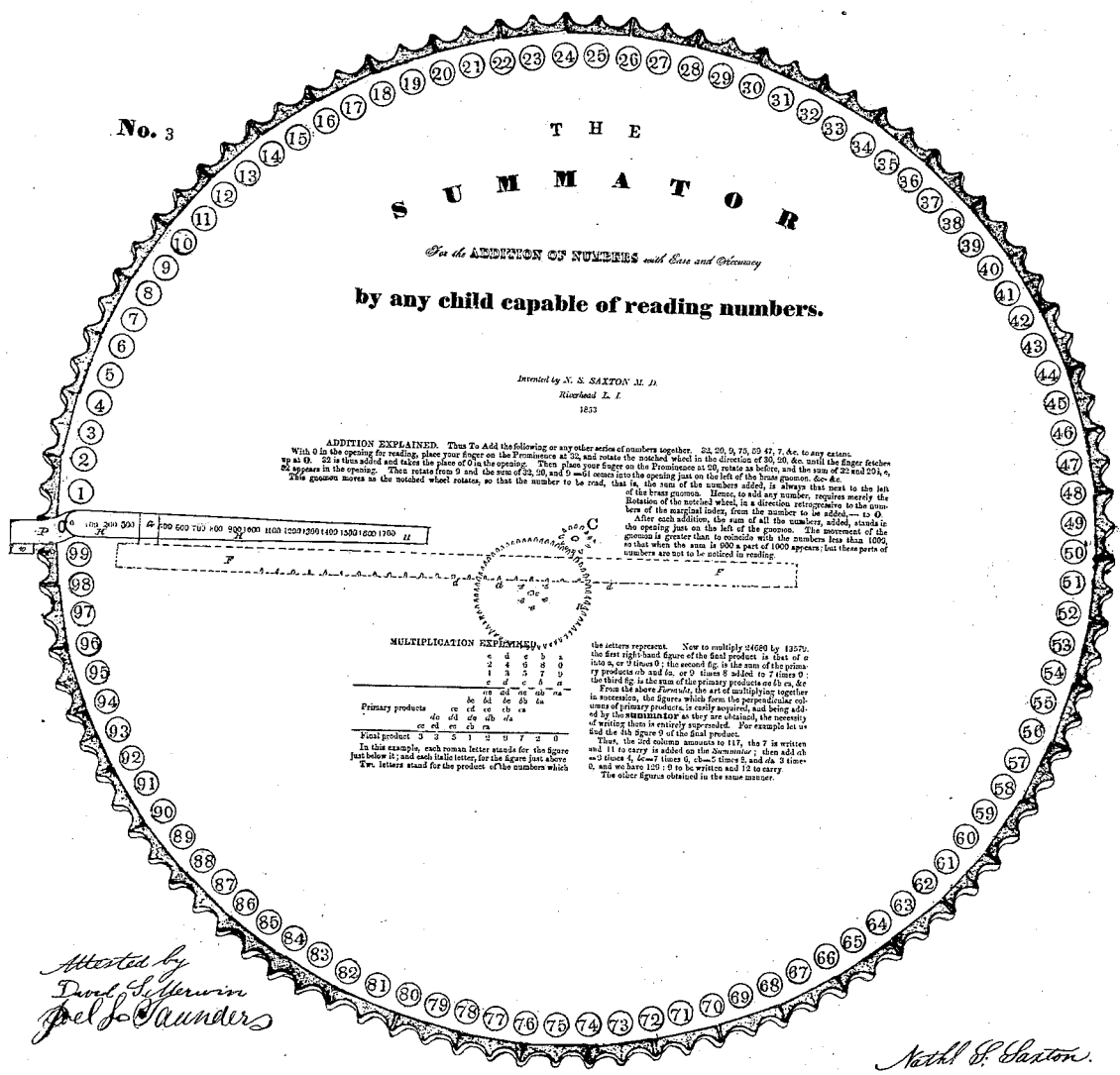

UNITED STATES PATENT OFFICE.

NATHANIEL S. SAXTON, OF RIVERHEAD, NEW YORK.

MACHINE FOR ADDING NUMBERS.

Specification of Letters Patent No. 13,800, dated November 13, 1855.

*To all whom it may concern:*

Be it known that I, NATHANIEL S. SAXTON, of Riverhead, in Suffolk county, and State of New York, have invented a new and useful Apparatus, which I call the "Summator," for the Purpose of Performing the Addition of Numbers with Ease and Accuracy; and I do hereby declare that the following is a full and exact description of the construction and operation of the same, reference being had to the accompanying plates of drawings and to the letters and other references marked thereon.

It consists of two wheels Nos. 1 and 2.

Plate No. 1 represents wheel No. 1. This is a wheel of pasteboard or other convenient material, of a size which will allow the division of its circumference into one hundred equidistant projections, to each of which the finger, or some other convenient instrument may be applied. These projections or digitations are marked thus N: R: On the front plain or disk of this wheel No. 1 is a column of the cardinal numbers, extending from cipher 0, 1, 2, 3, 4, 5, 6, 7, &c., to any required extent, arranged in the form, of a concentric spiral, and also in the form of radii, one hundred in number, corresponding to the circumferential projections. At the center of this wheel, and at right angles to the plain thereof, a metallic tube is secured, as a journal box, for this wheel to revolve upon. On this journal box is a pinion A (Plate No. 2) for purposes to be noticed.

Plate No. 2 represents wheel No. 2. This is a wheel of wood or other material so much smaller than wheel No. 1 as to leave the circumferential projections of No. 1 projecting beyond the circumference of wheel No. 2 when both are upon the same axis, in contact with each other. The circumference of the front disk of wheel No. 2 is divided into one hundred equal spaces, numbered ⓪, ①, ②, ③, ④, &c., each number inclosed within a circle designed to show the amount of space which the number is intended to occupy; which numbers I term the marginal index. Through this wheel is a long opening or slot marked H, H, H, extending from cipher ⓪ of the marginal index, toward the center of the wheel. Just under the long opening or slot H, H, H, and parallel thereto is a movable slide F, F, placed between the two wheels No. 1 and No. 2 (in a groove in No. 2 or otherwise) with an arm G, (which I call the gnomon) extending across the slot H, H, H. In the lower edge of the slide F F are small slots marked d, d, d, d, d, d, d, into which pins e, e, e, e, e, e, of the gearing or movement wheel B, work as the wheel B revolves. This geared wheel B has teeth by which it is geared with pinion A; the former is an appendage of wheel No. 2, while the latter (pinion A) is an appendage of wheel No. 1; the gearing therefore takes place only when the two parts, or wheels Nos. 1 and 2 are brought together upon the same axis, movement of gnomon G.

Plate No. 3 represents the whole apparatus except the support, board, disk, counter or stand upon which it is to be placed for use, &c. In this plate the only parts of wheel No. 1 in view are the circumferential projection N: R: and one radial line of figures at a time, seen through the long slot H. H, H. That exhibited in the plate is 0. 100, 200, &c. to 1700. Of wheel No. 2 the whole front or face is here seen, showing the marginal index ⓪ ① ② ③ ④ ⑤ ⑥ &c., which are so placed as to number all the circumferential projections of wheel No. 1 around to ㊾ the largest number except by two figures. At C in the center is a hole through both wheels (No. 1 and No. 2,) for the axis or center pin on which wheel No. 1 revolves, and by which (with plate P) wheel No. 2 is secured in its place.

P is a plate of brass or other metal firmly secured to wheel No. 2 at or near cipher ⓪ of the marginal index, and also secured to a block forming part of the support or stand upon which the apparatus is to be placed for use, by screws. In the rotation of wheel No. 1 the circumferential projections N: R: glide under this plate P, the object of which is to prevent rotation or other motion of the wheel No. 2.

H, H, H, is the long slot through wheel No. 2 as described in plate 2, showing the gnomon G, and one of the radii lines of numbers on wheel No. 1.

Operation and explanation: Referring to different drawings, the operation is identical with that of counting fingers, balls, &c. Numbers are represented by angular spaces, each space equal to unity and represented by a projection, and the projections numbered (notwithstanding the movements) unalterably by the marginal index. Now place your finger on projection opposite ㉕, rotate from right to left (keeping your finger on the projection) until your finger comes in contact with the brass plate P—and 25 is added to the number in the slot H H H, before you make the movement, *i. e.*, if 0 was on the left of the gnomon G before you moved the wheel No. 1, 25 will be thereafter the move. While thus adding the gnomon G slowly approaches the center, moving at a rate exactly to coincide with the concentricity of the spiral. Therefore:

*Movement of the gnomon G.*—Pinion A is an appendage of wheel No. 1 and therefore rotates with that wheel. All the other parts of the movement in the gearing designed to carry the gnomon G, are appendages of wheel No. 2 and are secured to the wheel No. 2, moving as follows: Wheel B, being geared into pinion A is moved by the rotation of the notched wheel No. 1. The rotary motion of wheel B, imparts a sliding motion to slide F F by means of the pins *e e e e e e* of wheel B working into the slots *d d d d d d* of the slide F F. Hence the movement of gnomon G; it being a part or appendage of slide F F. This rotation of the notched wheel No. 1 has fixed limits, and mechanical stops at S (Plate No. 1). This after the sum of all the terms to be added, is found; the notched wheel (No. 1) is retrograded or backed up, and the slide F F takes an eccentric motion, until the left hand end projects beyond the circumference of wheel No. 2 and thereby comes in contact with the fixed stopper S of the revolving wheel No. 1 (Plates No. 1 and No. 2). The rotation is therefore checked in that direction, and at the point which brings 0 into the slot H H H immediately on the left of the gnomon G, but to protect the slide F F in thus checking the movement, a part of the plate P forms a shoulder at X (Plate No. 2) against which the slide F F is brought by the impulse at S.

The rotation direct, *i. e.*, the rotation in the direction for adding numbers, may perchance be carried beyond the proper limits; in which case the right hand end of the slide F F projects beyond the circumference of wheel No. 2 and thereby comes in contact of the same fixed stopper S (Plates No. 1 and No. 2).

The retrograde motion of wheel No. 1 may in some cases be performed by a weight or spring but that part is not claimed to be patented—

What I claim as my improvement in machines for adding numbers, is—

The spiral scale of numbers combined with the traversing gnomon, substantially in the manner and for the purpose herein set forth.

NATHANIEL S. SAXTON.

Attested by—
C. LOCKWOOD,
GEO. BUCKINGHAM.